US008997217B2

(12) United States Patent
Aciicmez et al.

(10) Patent No.: US 8,997,217 B2
(45) Date of Patent: *Mar. 31, 2015

(54) SAFELY PROCESSING AND PRESENTING DOCUMENTS WITH EXECUTABLE TEXT

(75) Inventors: Onur Aciicmez, Santa Clara, CA (US); Shuo Tang, Urbana, IL (US)

(73) Assignee: Samsung Electronics Co., Ltd., Suwon (KR)

(*) Notice: Subject to any disclaimer, the term of this patent is extended or adjusted under 35 U.S.C. 154(b) by 954 days.

This patent is subject to a terminal disclaimer.

(21) Appl. No.: 12/693,152

(22) Filed: Jan. 25, 2010

(65) Prior Publication Data
US 2011/0185427 A1    Jul. 28, 2011

(51) Int. Cl.
*G06F 21/00* (2013.01)
*H04L 29/06* (2006.01)
*G06F 21/53* (2013.01)
*G06F 21/55* (2013.01)
*G06F 21/57* (2013.01)

(52) U.S. Cl.
CPC ............ *H04L 63/1441* (2013.01); *G06F 21/53* (2013.01); *G06F 21/55* (2013.01); *G06F 21/57* (2013.01); *G06F 2221/2101* (2013.01); *G06F 2221/2119* (2013.01); *G06F 2221/2149* (2013.01)
USPC ................ 726/22; 726/24; 726/26; 715/200; 715/234; 715/237

(58) Field of Classification Search
USPC ................ 726/22, 24, 26; 715/200, 234, 237
See application file for complete search history.

(56) References Cited

U.S. PATENT DOCUMENTS

| 6,345,278 | B1 | 2/2002 | Hitchcock et al. | |
|---|---|---|---|---|
| 7,343,626 | B1 | 3/2008 | Gallagher | |
| 7,530,107 | B1 | 5/2009 | Ono et al. | |
| 7,779,399 | B2 | 8/2010 | Huang et al. | |
| 7,870,294 | B2 | 1/2011 | Braddy et al. | |
| 7,899,757 | B1 * | 3/2011 | Talan et al. ............. | 705/319 |
| 7,934,253 | B2 | 4/2011 | Overcash et al. | |
| 2007/0074169 | A1 | 3/2007 | Chess et al. | |
| 2007/0107057 | A1 | 5/2007 | Chander et al. | |
| 2007/0130620 | A1 * | 6/2007 | Pietraszek et al. .......... | 726/22 |
| 2008/0120722 | A1 | 5/2008 | Sima et al. | |

(Continued)

OTHER PUBLICATIONS

"Noncespaces: Using Randomization to Enforce Information Flow Tracking and Thwart Cross-Site Scripting Attacks" by Matthew Van Gundy and Hao Chen; University of California, Davis; Proceedings of the 16th Annual Network, 2009—isoc.org.*

(Continued)

*Primary Examiner* — Jason Lee
(74) *Attorney, Agent, or Firm* — Sherman IP LLP; Kenneth L. Sherman; Steven Laut

(57) ABSTRACT

Techniques for processing documents with executable text are disclosed. The techniques, among other things, can effectively address XSS attacks to Internet users when browsing web sites. Content deemed not to be trusted or fully trusted ("untrusted") can be marked in a document that can include executable text. Remedial action, including not allowing execution of executable text marked as "untrusted" can be taken. In addition, when the document is processed, content deemed not to be trusted or fully trusted ("untrusted") can be effectively monitored in order to identify executable text that may have been effectively produced by "untrusted" content and/or somehow may have been affected by "untrusted" content.

21 Claims, 7 Drawing Sheets

(56) References Cited

U.S. PATENT DOCUMENTS

| | | | |
|---|---|---|---|
| 2009/0119769 A1 | 5/2009 | Ross et al. | |
| 2009/0320135 A1* | 12/2009 | Cavanaugh | 726/24 |
| 2011/0185271 A1 | 7/2011 | Aciicmez et al. | |

OTHER PUBLICATIONS

"Using Web Application Construction Frameworks to Protect Against Code Injection Attacks"; Benjamin Livshits and U'lfar Erlingsson; Proceeding PLAS '07 Proceedings of the 2007 workshop on Programming languages and analysis for security; pp. 95-104 ACM New York, NY, USA © 2007 ISBN: 978-1-59593-711-7.*

"Noncespaces: Using Randomization to Enforce Information Flow Tracking and Thwart Cross-Site Scripting Attacks"; Gundy et al; NDSS, 2009; 13 pages.*

Jim et al., "*Defeating Script Injection Attacks with Browser Enforced Embedded Policies*", International World Wide Web Conference Proceedings of the 16th international conference on World Wide Web, Banff, Alberta, Canada, 2007, pp. 601-610.

Van Gundy et al., "*Noncespaces: Using Randomization to Enforce Information Flow Tracking and Thwart Cross-site Scripting Attacks*", Proceedings of the 2009 ICSE Workshop on Software Engineering for Secure Systems, 2009, pp. 33-39.

Nadji et al., "*Document Structure Integrity: A Robust Basis for Cross-site Scripting Defense*", Proceedings of the Network and Distributed System Security Symposium, NDSS 2009, San Diego, California, USA, Feb. 8-Feb. 11, 2009.

U.S. Non-Final Office Action for U.S. Appl. No. 12/693,168 mailed Jun. 24, 2011.

U.S. Final Office Action for U.S. Appl. No. 12/693,168 mailed Nov. 25, 2011.

U.S. Non-Final Office Action for U.S. Appl. No. 12/693,168 mailed Aug. 15, 2014.

* cited by examiner

SAFELY PROCESSING AND PRESENTING DOCUMENTS WITH EXECUTABLE TEXT

CROSS-REFERENCE TO RELATED APPLICATIONS

This application is related to U.S. patent application Ser. No. 12/693,168, entitled "MARKING DOCUMENTS WITH EXECUTABLE TEXT FOR PROCESSING BY COMPUTING SYSTEMS", which is hereby incorporated by reference herein in its entirety and for all purposes.

BACKGROUND OF THE INVENTION

Conceptually, a computing system (e.g., a computing device, a personal computer, a laptop, a Smartphone, a mobile phone) can accept information (content or data) and manipulate it to obtain or determine a result based on a sequence of instructions (or a computer program), effectively describing how to process the information. Typically, the information is stored in a computer readable medium in a binary form. More complex computing systems can store content including the computer program itself. A computer program may be invariable and/or built into, for example, a computer (or computing) device as logic circuitry provided on microprocessors or computer chips. Today, general purpose computers can have both kinds of programming. Storing content (or information retention) is of one the core functions of computing devices. Today, numerous types of computing devices are available. These computing devices range widely with respect to size, cost, amount of storage, and processing power. The computing devices that are available today include: expensive and powerful servers, relatively cheaper personal computers (PC's) and laptops, and less expensive microprocessors (or computer chips) provided in storage devices, automobiles, and household electronic appliances.

Today, the Internet is widely used for various applications and the general public by and large is familiar with accessing content via the Internet, especially from numerous commercial and public web sites that have become available over the years. Typically, a web browser (e.g., Internet Explorer, Mozilla Firefox) is used to interact with the Internet. A web browser can, for example, be provided as a software application for retrieving, presenting, and traversing information resources on the World Wide Web. An information resource (e.g., a web site) can be identified by a Uniform Resource Identifier (URI). An information resource can, for example, include images, video, text and other forms of content. Hyperlinks can be present in a resource and can enable users to easily navigate their browsers to related resources.

HyperText Markup Language (HTML) is the predominant markup language for web pages. HTML can be used to create structured documents by denoting structural semantics for text (e.g., headings, paragraphs, lists) as well as for links, quotes, and other items. HTML also allows images and objects to be embedded and used to create interactive forms. Typically, a web page is written in the form of HTML elements consisting of "tags" surrounded by angle brackets within the web page content.

Original web browsers were static in nature, designed to only render hyperlinked documents in a relatively straightforward manner. Later, scripting protocols such as JavaScript were developed, which, among other things, allowed scripts to be embedded in a resource in order to provide simpler dynamic functionality to support user interactions and animated menus.

AJAX, which is an acronym for Asynchronous JavaScript and Extensible Markup Language (XML) can be considered as a group of interrelated web development techniques used on a client-side to create interactive web applications. It is generally believed that the use of AJAX techniques has led to a dramatic increase in interactive or dynamic interfaces on web pages. Today, AJAX applications can rival desktop applications when it comes to speed and performance.

Today, processing a webpage with executable code (e.g., JavaScript) can be relatively complex and has resulted in development of relatively more complex web browsers over the years. To illustrate this complexity, FIG. 1A depicts the simplified operations of a typical web browser. Referring to FIG. 1A, a resource (e.g., a web page) is downloaded from a web server 10. Images from the web page are separated out by an image separator 12. The web page is then fed to a document object model (DOM) parser 14, which parses the web page into a DOM data structure (e.g., a DOM tree) 16. The DOM data structure 16 can represent an abstract syntax tree of the document. Content referenced by the web page is then fetched from the web server 10 and in-lined into the DOM. As the content necessary to display the page is downloaded and decompressed, the web page becomes available for viewing. Typically, the web page layout is incrementally solved and drawn to the screen. A layout module 18 performs the laying out of the elements of the web page, along with images decoded by image decoder 11. A rendering module 20 then renders the web page in the browser window.

After the initial page load, scripts (e.g., JavaScripts) 15 respond to events (e.g., events generated by user input or server messages). It should be noted that the scripts 15 can then rewrite the DOM data structure 106 based on the events. This, in turn, causes the page layout to be recomputed and redrawn.

Generally, loading an HTML page can set off a cascade of events: the HTML page is scanned, parsed and compiled into a document object model (DOM) which can be an abstract syntax tree of the document. Content referenced by URLs can be fetched and in-lined into the DOM. As the content necessary to display the page becomes available, the page layout can be incrementally solved and drawn to the screen. After the initial loading of the HTML page, scripts can respond to events generated, for example, by user input and server messages, typically modifying the DOM. This may, in turn, cause the HTML page layout to be recomputed and redrawn.

Today, Web pages/applications are typically written in HTML language. Below is a very simple HTML page as an example:

```
<HTML>
  <HEAD>
    <TITLE>My first HTML document</TITLE>
  </HEAD>
  <BODY>
    <P>Hello world!
  </BODY>
</HTML>
```

When a browser obtains this simple HTML page from a web server, it tokenizes the page first. A "lexer/tokenizer" can process the page (usually character by character) and extract its tokens. The tokens of the example above are: "<HTML>", "<HEAD>", "<TITLE>", "My first HTML document", "</TITLE>", "</HEAD>", "<BODY>", "<P>", "Hello world!", "</BODY>", and "</HTML>". A parser can use these tokens to construct a DOM tree and to checks the validity of the document, for example, by using push-down automaton as is generally known in the art. To elaborate even further, the structure of the DOM-tree for the exemplary HTML page is provided in FIG. 1B.

Popularity of web pages and more generally documents that include executable and non-executable content are evidenced by their ever increasing use in everyday life. Accordingly, improved techniques for processing or presenting them would be highly useful.

SUMMARY OF THE INVENTION

Broadly speaking, the invention relates to computing systems and computing environments. More particularly, the invention pertains to improved techniques for processing documents in computing systems and computing environments. The techniques, among other things, can effectively address XSS attacks posing a serious threat to Internet users, especially when browsing documents that can include both executable and non-executable content.

In accordance with one aspect of the invention, content deemed not to be trusted or fully trusted ("untrusted") can be marked in a document that can include executable text. Remedial action, including not allowing execution of executable text marked as "untrusted," can be taken in accordance with another aspect of the invention.

In accordance with yet another aspect of the invention, when a document that can include executable text is processed or is being processed, content deemed not to be trusted or fully trusted ("untrusted") can be effectively monitored in order to identify code that may have been effectively produced by "untrusted" content and/or somehow may have been affected by "untrusted" content. By way of example, executable text (e.g., script) that may have been effectively produced and/or affected by text marked as "tainted" text in a web page can be identified to be also "tainted" when the web page is processed or is being processed. It will be appreciated that these and other aspects of the invention can be combined.

For example, in accordance with one embodiment of the invention, a method can process a document that can include non-executable content and executable text. The document can be processed by determining whether executable text in the document has been derived from and/or affected by "untrusted" content in the document. As a result, executable text can be identified as "untrusted" content when it is determined that the executable text has been derived from or has been affected by "untrusted" text. The method may also include not allowing execution of the executable text that has been identified as having been derived or affected by "untrusted" text.

As another example, a computing system (e.g., a client device) can be operable to process a document that can include non-executable content and executable text in accordance with another embodiment of the invention. It should be noted that the document can include content marked as untrusted content representative of content not trusted or not fully trusted. The computing system can be operable not to allow (or deny) execution of executable text marked as untrusted content. The computing system may also be operable to mark content in the document as untrusted content when the computing system has determined that the content has been derived from and/or affected by the untrusted content in the document.

A document can, for example, be a web page that can be obtained by a client device via the Internet. The web page may already be marked with "tainted" text when it is obtained by the client device which may be operable to also identify and mark text in the web page that is not trusted or fully trusted as "tainted" text. By way of example, text associated with input or other sources considered to be suspicious can be marked as "tainted" text. In any case, the client device can be operable to effectively track the "tainted" text and mark any executable text that may have been derived or affected by the "tainted" text. By way of example, text can be considered to be "tainted" when the text is affect by or derived from "tainted" text as result of an assignment operation, an arithmetic or logic operation, a function call, and/or a control flow operation. It will be appreciated that the "tainted" mark may also be stored and tracked in DOM trees to keep track of any modifications made by tainted data.

Generally, it will be appreciated that the described techniques are highly effective against XSS attacks including DOM-based XSS attacks.

The invention can be implemented in numerous ways, including, for example, a method, an apparatus, a computer readable (and/or storable) medium, and a computing system (e.g., a computing device). A computer readable medium can, for example, include and/or store at least executable computer program code stored in a tangible form. Several embodiments of the invention are discussed below.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

Figure 1A:
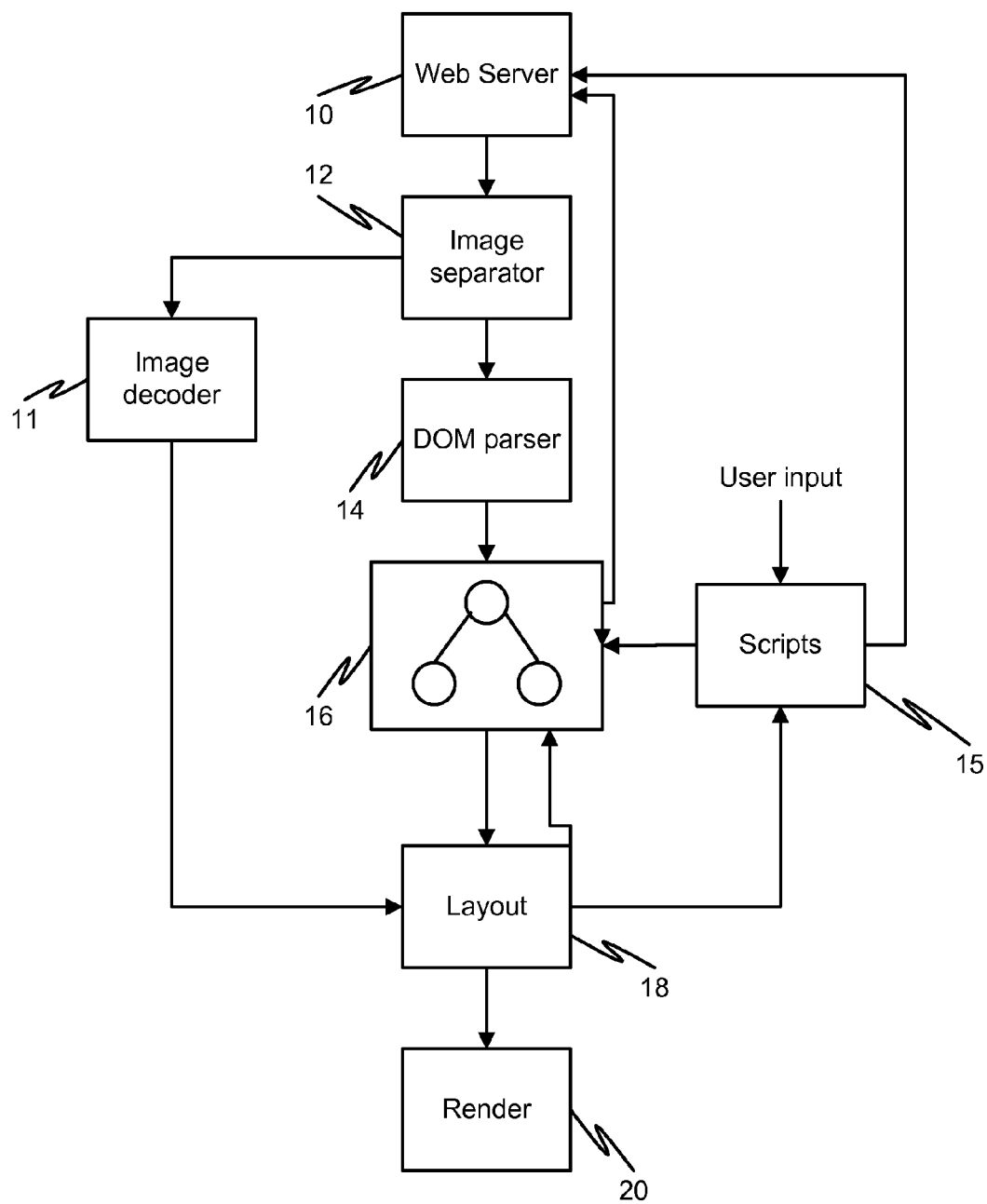
FIG. 1A depicts the simplified operations of a typical web browser.
Figure 1B:
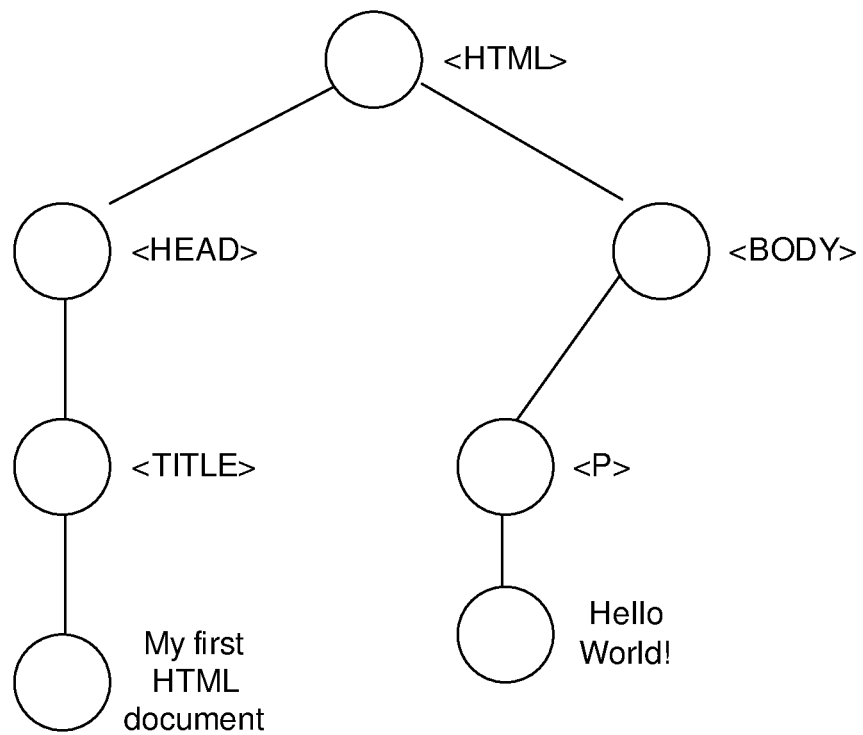
FIG. 1B depicts the structure of aDOM-tree for an exemplary HTML page.

As noted in the background section, providing content in a form that can include both executable and non-executable content is very useful. Today, predominately, web pages provide various forms of non-executable content as well as executable code primarily in the form of a script (e.g., JavaScript).

Referring to the discussion in the background section regarding processing a web page, use of JavaScript and DOM allow delivery of illegitimate and often malicious executables in the form of script to client computers via the Internet. As an example, a common JavaScript-related security problem is cross-site scripting ("XSS") where malicious entities (attackers) can inject HTML code or client script code (e.g., JavaScript) to a web page that could be viewed by numerous other entities (victims). The injected code can run in the same origin of target page in order to bypass the popular security policy enforced in contemporary browsers—same origin policy. Thus, an attacker could execute code to steal information from a victim or perform actions on behalf of victim unbeknownst to an unsuspecting victim.

Today, at least three (3) types of XSS attacks can be indentified:

a) Persistent attacks: attackers inject malicious code into a Web application in the server side and are able to affect all the users that use the Web application. Typical examples are public Internet forums or Wiki-like sites. Attacker could submit content of JavaScript (which should be plain text or legitimate HTML code) to web servers and every user browses the site would be subjected to the attack of the malicious JavaScript code.

b) Reflective attacks: user data can be used to generate a temporary page sent back to the same user. If the user supplied data is not properly sanitized and it contains, for example, malicious JavaScript code, the user can be subject to reflective XSS attack. In a simple attack scenario, the attacker could foul the victim to click a URL with a malicious payload that can be delivered in a Web page to the victim.

c) DOM-based attacks: this type of XSS can be similar to reflective attack and may have been mostly overlooked. Instead of generating a malicious page by the server side logic (e.g., a PHP), attackers can leverage client side logic to effectively deliver attack code.

In view of these serious threats to security, improved techniques for processing web pages would be very useful. More generally, improved techniques for processing documents that can include both executable and not executable content are needed especially given the usefulness of these documents.

It will be appreciated that improved techniques for processing documents that can include both executable and not executable content are disclosed. The techniques, among other things, can effectively address XSS attacks posing a serious threat to Internet users.

In accordance with one aspect of the invention, content deemed not to be trusted or fully trusted ("untrusted") can be marked in a document that can include executable text. Remedial action, including not allowing execution of executable text marked as "untrusted," can be taken in accordance with another aspect of the invention.

In accordance with yet another aspect of the invention, when a document that can include executable text is processed or is being processed, content deemed not to be trusted or fully trusted ("untrusted") can be effectively monitored in order to identify code that may have been effectively produced by "untrusted" content and/or somehow may have been affected by "untrusted" content. By way of example, executable text (e.g., script) that may have been effectively produced and/or affected by text marked as "tainted" text in a web page can be identified to be also "tainted" when the web page is processed or is being processed. It will be appreciated that these and other aspects of the invention can be combined.

For example, in accordance with one embodiment of the invention, a method can process a document that can include non-executable content and executable text. The document can be processed by determining whether executable text in the document has been derived from and/or affected by "untrusted" content in the document. As a result, executable text can be identified as "untrusted" content when it is determined that executable text has been derived from or has been affected by "untrusted" text. The method may also include not allowing execution of the executable text that has been identified as having been derived or affected by "untrusted" text.

As another example, a computing system (e.g., a client device) can be operable to process a document that can include non-executable content and executable text in accordance with another embodiment of the invention. It should be noted that the document can include content marked as untrusted content representative of content not trusted or not fully trusted. The computing system can be operable not to allow (or deny) execution of executable text marked as untrusted content. The computing system may also be operable to mark content in the document as untrusted content when the computing system determined that the content has been derived from and/or affected by the untrusted content in the document.

A document can, for example, be a web page that can be obtained by a client device via the Internet. The web page may already be marked with "tainted" text when it is obtained by the client device which may be operable to also identify and mark text in the web page that is not trusted or fully trusted as "tainted" text. By way of example, text associated with input or other sources considered to be suspicious can be marked as "tainted" text. In any case, the client device can be operable to effectively track the "tainted" text and mark any executable text that may have been derived or affected by the "tainted" text. By way of example, text can be considered to be "tainted" when the text is affect by or derived from "tainted" text as result of an assignment operation, an arithmetic or logic operation, a function call, and/or a control flow operation. It will be appreciated that the "tainted" mark may also be stored and tracked in DOM trees to keep track of any modifications made by tainted data.

Generally, it will be appreciated that the described techniques are highly effective against XSS attacks including DOM-based XSS attacks.

Embodiments of these aspects of the invention are discussed below in greater detail with reference to FIGS. 2A-4. However, those skilled in the art will readily appreciate that the detailed description given herein with respect to these figures is for explanatory purposes as the invention extends beyond these limited embodiments.

Figure 2A:
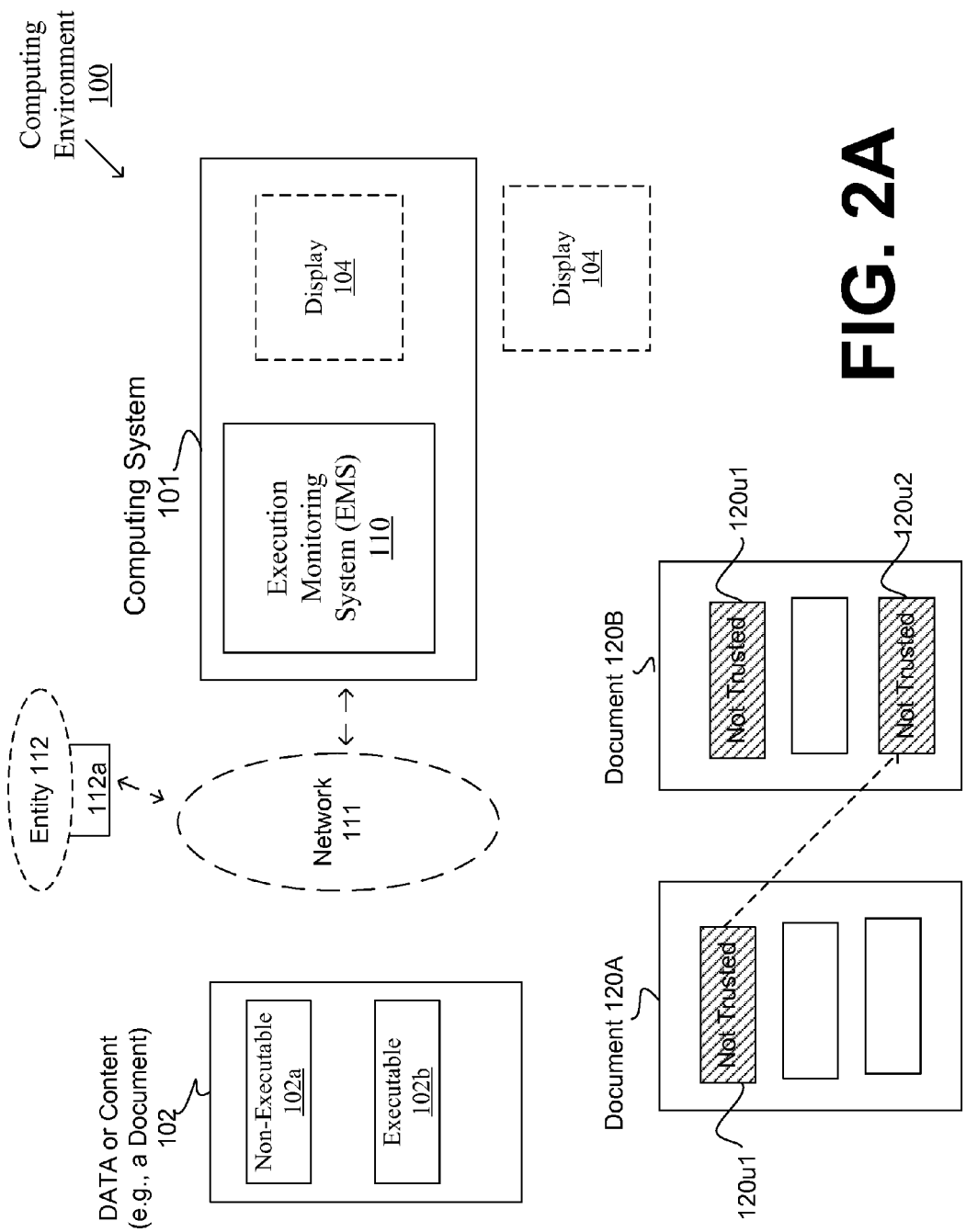
FIG. 2A depicts a computing environment in accordance with one embodiment of the invention.

FIG. 2A depicts a computing environment 100 in accordance with one embodiment of the invention. Referring to FIG. 2A, a computing system 101 can be operable to process data (or content) 102 as input (or input data). As will be appreciated by those skilled in the art, processing of data 102 can, for example, entail layout, rendering and/or displaying non-executable content 102a (e.g., non-executable text, images) on a display 104 that may or may not be part of the computing system 101. The processing of the data 102 by the computing system 101 can also entail execution of executable code (e.g., executable text, script) 102b. Generally, non-executable content 102a can be displayed or rendered on a display 104 and executable code 102b can be executed when the input data 102 is processed or is being processed by the computing system 101. Data 102 can, for example, be a document (e.g., a web page) that includes both non-executable content and executable code.

It should be noted processing the data 102 using conventional techniques may result in execution of illegitimate executable code. By way of example, when data 102 is a Webpage, an illegitimate script can be injected into the data 102 in a XSS attack. It should also be noted that an illegitimate script can be effectively generated during the processing of the data 102 as a result of insertion of illegitimate content that may not be necessarily executable content. This means that during the processing of data 102, illegitimate executable code can effectively replace legitimate executable code or non-executable content. In other words, processing of data 102 may be subject to injection of illegitimate and potentially harmful executable code. Today, this type of code injection is prevalent in the context of documents (e.g., web pages) that can include executable text typically in the form of a script, as well as displayable but non-executable content. As such, the computing environment 100 will be discussed in greater detail in the context of the input data 102 being provided as a document (102) that can include executable text and non-executable content (e.g., non-executable text, graphics).

Referring back to FIG. 2A, data 102 can, for example, be provided as a document (102) by another entity 112 (e.g., an organization, a company, an individual). This document (102) can, for example, be made available and accessed by various computing systems, including computing system 101 via a computer network 111 (e.g., the Internet) through a computing system 101 or device 102a (e.g., a server, a web server) associated with the entity 112. As such, illegitimate code may be effectively injected into this document (102) and executed when the document is being processed by, for example, operating on the computing system 101. The computing system 101 can, for example, be a computing device (e.g., a Personal Computer, a Smartphone) with one or more processors and/or processing cores (not shown), computer readable storage medium, including volatile and non-volatile memory (not shown) as will be readily known to those skilled in the art.

It will be appreciated that an Executable Monitoring System (EMS) 110 can be operable to effectively monitor execution of executable code in the document 102. More particularly, EMS 110 can effectively monitor and/or track content in the document 102 that is not trusted or fully trusted ("untrusted content") to identify executable text that has been originated or affected by the untrusted content. Generally, content of the document 102 can be identified or marked as "untrusted" content (or content not trusted or fully trusted) before processing the document 102. As will be described below, the EMS 110 and/or computing system 101 may also be operable to identity and mark "untrusted" content in the document 102. Alternatively, or in addition to "untrusted" content identified by the EMS 110 or computing system 101, "Untrusted" content may already be marked (or pre-marked) in the document 102, for example, by the other entity 112 as will be discussed in greater detail below.

To further elaborate, Referring to FIG. 2A, "untrusted" content 120u1 can be marked (or pre-marked) in a document 120A. When the document 120A is being processed, the EMS 110 can determine whether the "untrusted" content 120u1 has originated and/or affected other content in the document 120. As a result, during the processing of the document 120A, EMS 110 may also mark other content (120u2) as "untrusted" content in the document 120A. The resulting document is depicted as document 120B in FIG. 2A. Prior to execution of executable text, the EMS 110 can determine whether the executable text has been marked as "untrusted" in the document 120 and appropriate or remedial action, including not allowing the execution of any executable text marked as "untrusted" can be taken. As a result, EMS 110 may not allow execution of executable text associated with "untrusted" content 120u1 and 120u2.

Figure 2B:
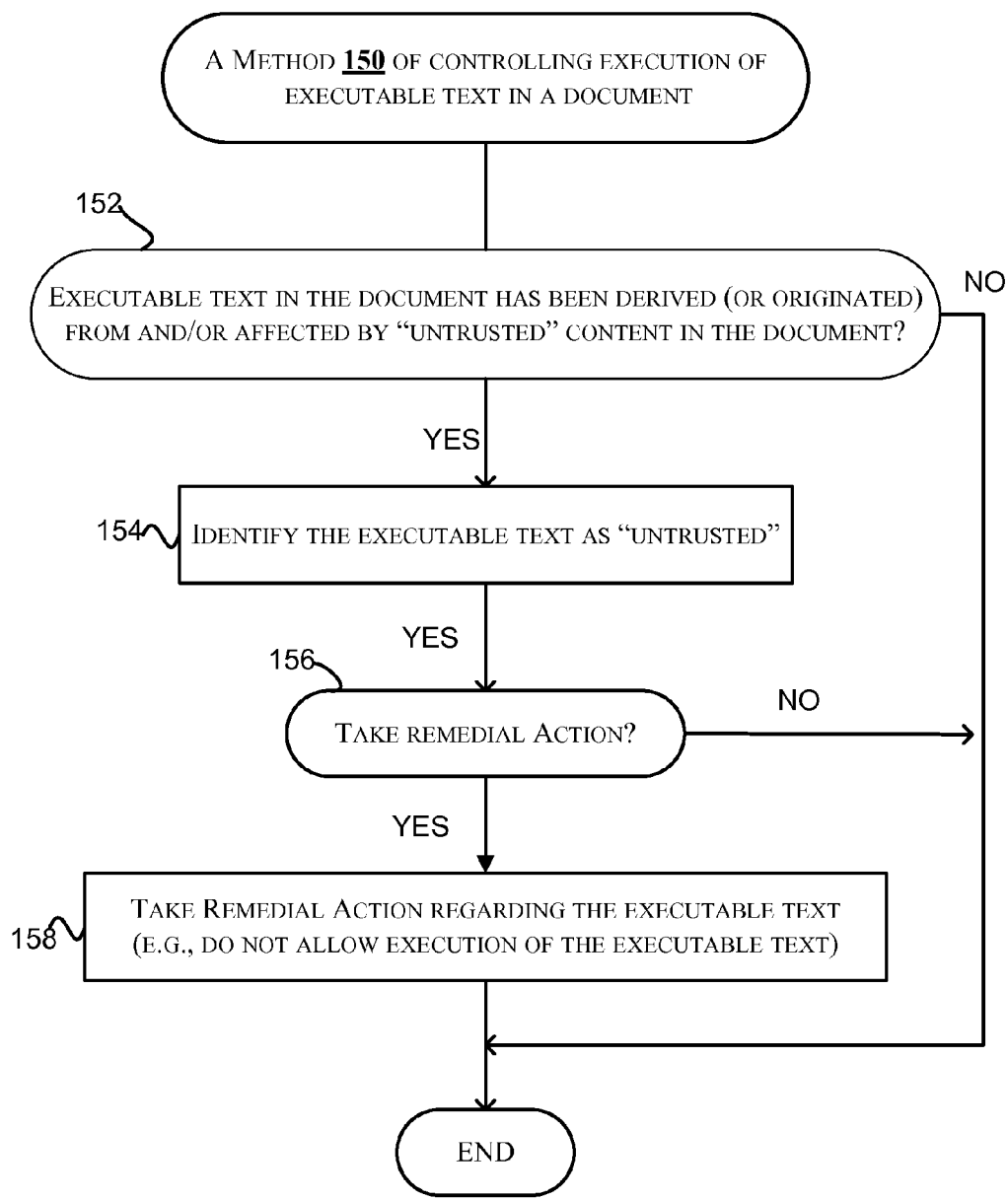
FIG. 2B depicts a computer-implemented method for controlling execution of executable text in a document in accordance with one embodiment of the invention.

To elaborate even further, FIG. 2B depicts a computer-implemented method 150 of controlling execution of executable text in a document in accordance with one embodiment of the invention. It should be noted that the document can include non-executable content (e.g., non-executable text, an image) and executable text (e.g., a script). Method 150 can, for example, be performed by the EMS 110 (shown in FIG. 1A).

Referring to FIG. 2B, initially, it is determined (152) whether executable text in the document has been derived (or originated) from and/or affected by "untrusted" content in the document. Typically, the determination (152) is performed when the document is processed or is being processed and the "untrusted" content includes content not trusted or not fully trusted. If it is determined (152) the executable text in the document has not been derived from or affected by "untrusted" content in the document, the method 150 can end.

However, if it is determined (152) that the executable text in the document has been derived from or affected by "untrusted" content in the document, the executable text can be identified (154) as "untrusted" executable and it can be determined (156) whether to take remedial action regarding execution of the executable text. This determination (156) can, for example, represent a design choice or can be made based on one or more criteria (e.g., preference or input provided by a user). Accordingly, Remedial action can be taken (158) if it determined (156) to take remedial action regarding the executable text identified to be "untrusted." Remedial action can, for example, include not allowing execution of the executable text, displaying the executable text or displaying whit spaces instead of executing the executable text. Method 150 can end after remedial action is taken or it can end without taking remedial action if it is determined (156) not to take remedial action.

As noted above, executable code and non-executable content can be presented in a form of a document. One example of such a document is a web page that can typically have non-executable text and executable text (e.g., script). Given the prevalence of such documents, especially web pages in various computing environments and system that are available today, an Execution Monitoring System (EMS) suitable for computing environments that process documents is discussed in greater detail below.

Figure 3A:
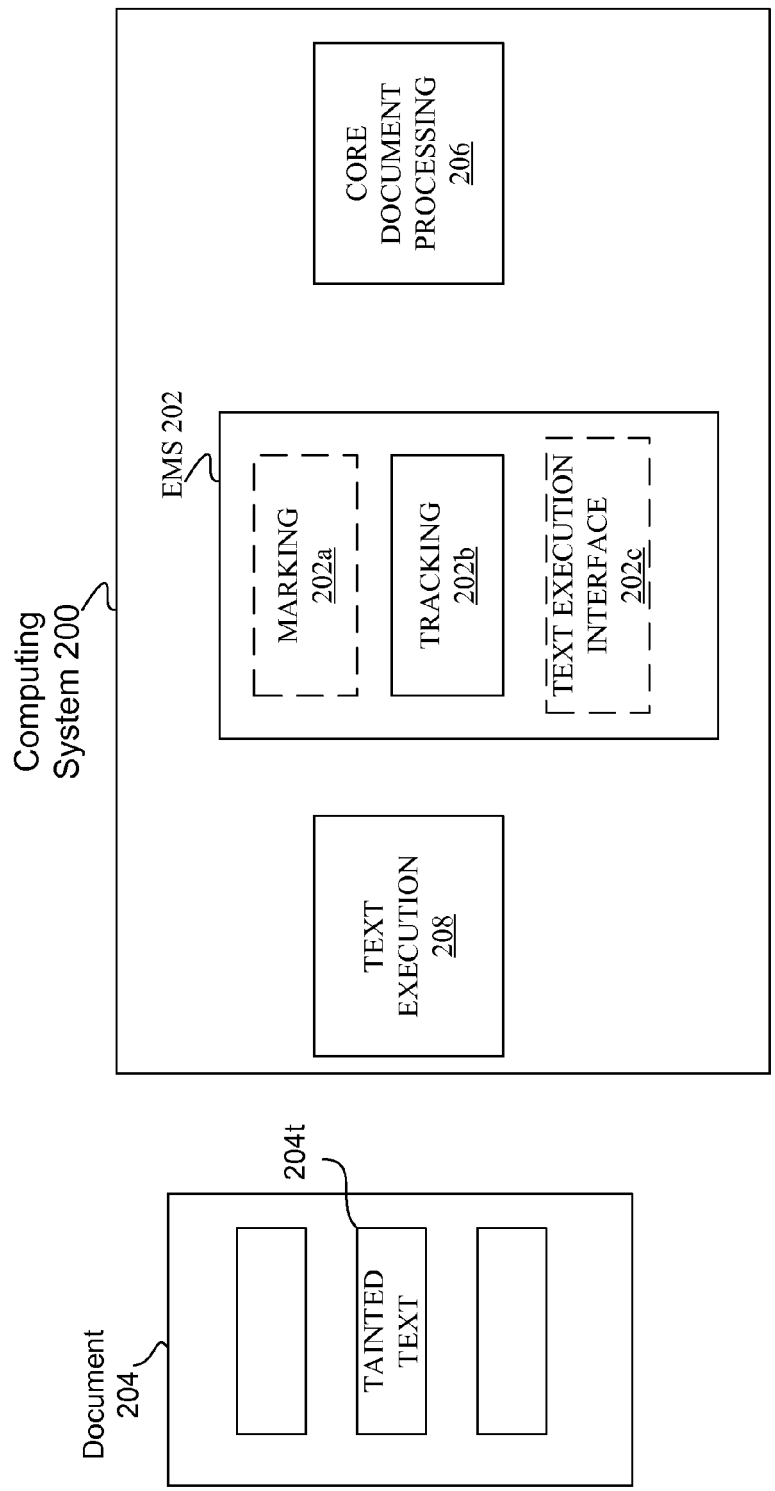
FIG. 3A depicts an Execution Monitoring System (EMS) provided for a computing system in accordance with another embodiment of the invention.

More specifically, FIG. 3A depicts an Execution Monitoring System (EMS) 202 provided for a computing system 200 in accordance with another embodiment of the invention. Referring to FIG. 3A, the computing system 200 is operable to process a document 204. It should be noted that the document 204 can include non-executable text and executable text. As will be appreciated by those skilled in the art, a core document processing component 206 (or module) can be generally operable to process the document 204 and cause content including non-executable text provided in the document to be displayed on a display (not shown). In addition, a text execution component 208 can effectively execute executable text in the document 202 during the processing of the document 204. Conceptually, EMS 202 can include one or more components, namely a marking component 202a, tracking component 202b, and a text-execution interface 202c. Generally, marking component 202a can identify and mark text in the document 204 that is not trusted or not fully trusted as "tainted text" 204t. Content including text that can be altered or easily altered in the document 204 can be identified and marked as tainted text by the marking component 202a. For example, text corresponding to input or input data (e.g., user input) can be identified as text that can be easily altered by an attacker.

It should be noted that the document 204 can be pre-marked with "tainted" text 204t. As such, the EMS 202 may be operable without the marking component 202a. The marking component 202a may also be used to supplement or augment identification and marking of text as "tainted text"

204*t*. It should be noted that the "tainted text" 204*t* does not have to be a part of a "static" document or marked in a persistent manner. Marking component 202*a* can be operable to mark text in a "tainted text" 204*t* in a dynamic manner and/or a temporary manner. For example, a web application may initially contain no "tainted" text in its original form, but when a user downloads it to start using it, the user may type text as input to the web application. Marking component 202*a* can mark the input provided by the user as "tainted text" 204*t* even though the original document 204 may not have contained any tainted text. In this case, "tainted text" 204*t* does not have to reside in memory in a persistent manner and the "tainted text" 204*t* does not have to be a permanent part of the document 204. As a result, "tainted text" 204*t*" corresponding to user input may not be present when the same web application is opened again.

In any case, the tracking component 202*b* can effectively propagate the "tainted" mark of the "tainted text" 204*t* to other text in the document as a result of interaction with the "tainted text" 204*t*. More specifically, it can be determined whether other text representative of data (e.g., variables, parameters, values) has been derived and/or affected by the "tainted text" 204*t* or has been "tainted" as a result of interacting with the "tainted text" 204*t* as will be appreciated by those skilled in the art. By way of example, data representative of a variable, parameter and/or value can be derived, as a result of an assignment involving "tainted" text representative of a "tainted" variable, parameter and/or value. Text-execution interface 202*c* can be optionally provided to interface with the text-execution component 208 in order to identify executable text that is marked as "tainted" before the text-execution component 204 executes the executable text. Text-execution interface 202*c* may also be operable to determine remedial action to be taken in lieu of execution of "tainted" text 204*t*. By way of example, the interface 202*c* may determine to display the "tainted" executable text 204*t* as non-executable text and communicate with the core document processing 206 to achieve displaying of the "tainted" executable text 204*t* instead of allowing the text-execution component 208 to execute the "tainted" executable text. The components of the EMS 202 may be effectively distributed between the core document processing 206 and text-execution component 208 as will be readily known to those skilled in the art.

Figure 3B:
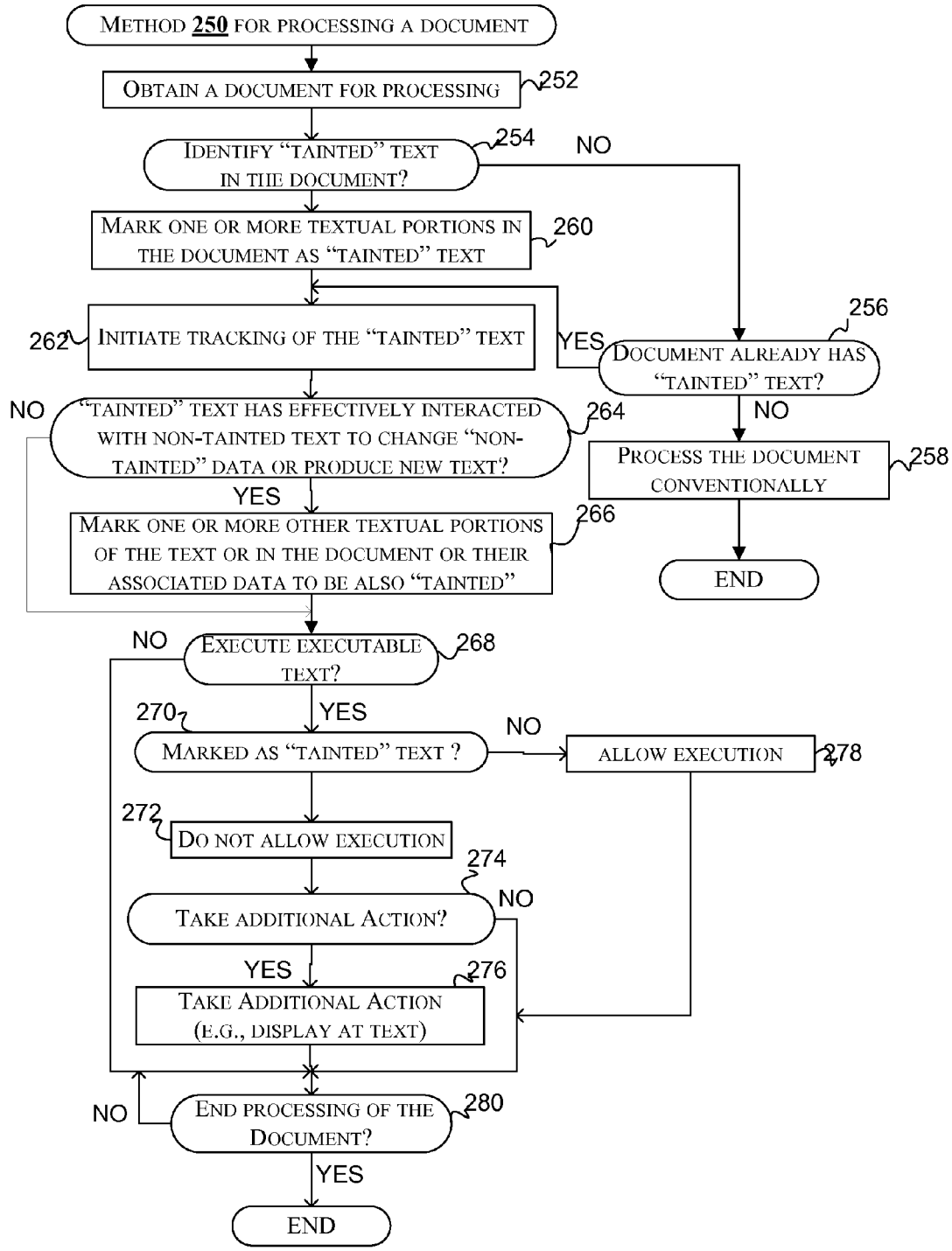
FIG. 3B depicts a method for processing a document in accordance with one embodiment of the invention.

To further elaborate, FIG. 3B depicts a method 250 for processing a document in accordance with one embodiment of the invention. Referring to FIG. 3B, initially, a document that can include both executable text and non-executable content (e.g., non-executable text) is obtained (250). Next, it is determined (252) whether to identify text in the document to be marked as "tainted" text. As will be appreciated by those skilled in the art, this determination can represent a design choice or can be made based on one or more criteria (e.g., the type of the document, user input or preference). If it is determined (252) not to identify text for marking as "tainted" text, it can be determined (256) whether the document already includes text marked as "tainted" text. If it is determined (256) that the document does not include "tainted" text, the document can be processed (258) conventionally before the method 250 ends.

However, if it is determined (252) to identify text in the document to be marked as "tainted" text, one or more textual portions of the document can be marked (260) as "tainted text" and tracking of the tainted text can be initiated (262) before allowing text to be executed. More particularly, it is determined (264) whether "tainted" text or data associated with it has effectively interacted with "non-tainted" text or data associated with 'non-tainted" text. As a result, one or more textual portion of the document or their associated data can be marked (266) to be "tainted" text or data.

During the processing of the document, it can be determined (268) whether executable text is to be executed. However, if it is determined (270) that the executable text is marked to be "tainted," the executable text is not allowed to be executed (272) and additional action may be taken (276) if it determined (274) to take additional action. For example, executable text may be displayed or logged. Executable text not marked as "tainted" can be allowed (278) to execute. The method 250 can proceed to process the document until if is determined (280) to end the processing of the document.

Figure 4:
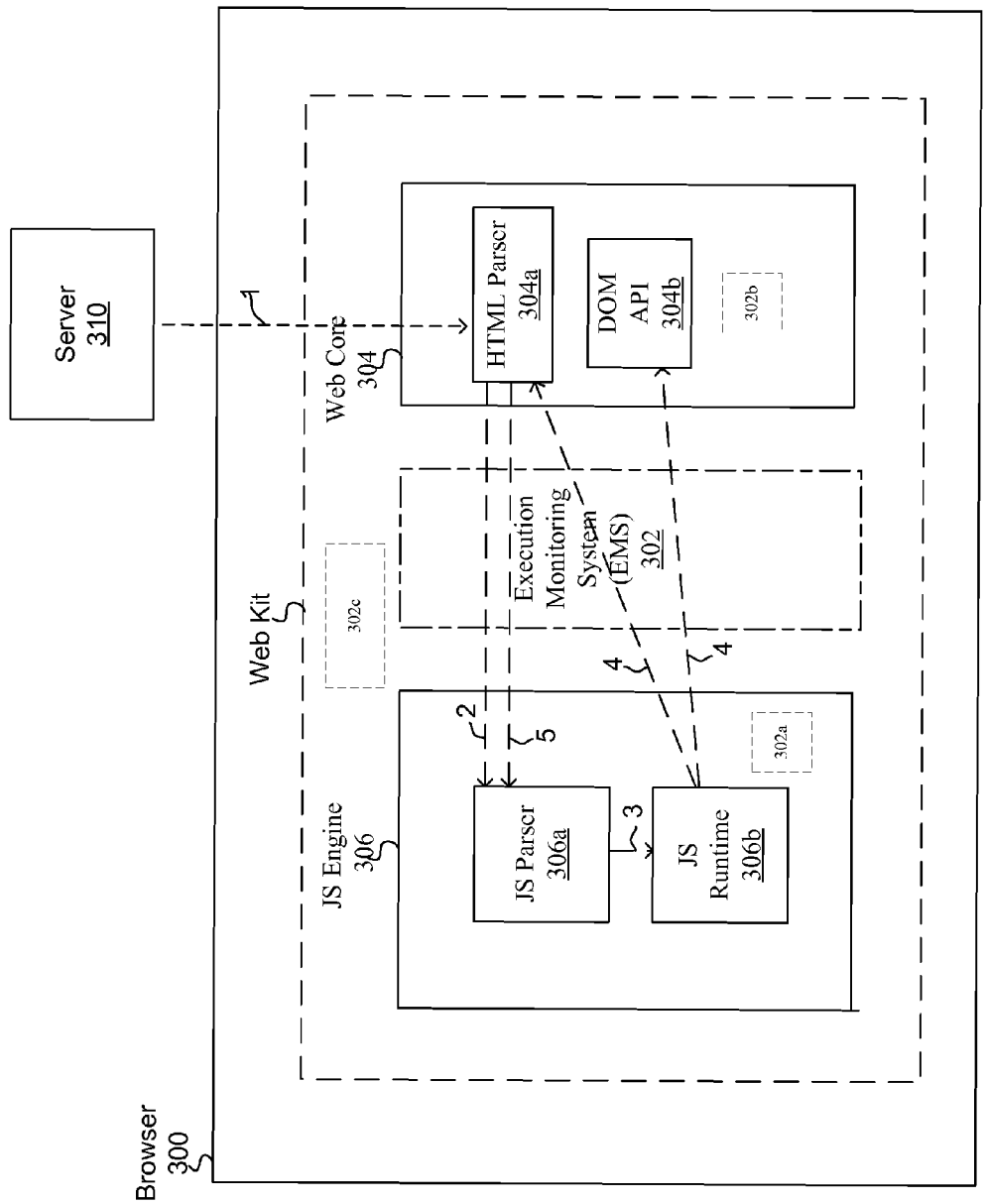
FIG. 4 depicts an Execution Monitoring System (EMS) provided as a part of a Browser in accordance with another embodiment of the invention.

Given the prevalence of web pages, Java Scripts, and browsers in various computing systems that are widely used today, an Execution Monitoring System (EMS) suitable for computing environments that process web pages that can include Java Scripts as executable text is discussed in greater detail below. More specifically, FIG. 4 depicts an Execution Monitoring System (EMS) 302 provided as a part of a browser 300 in accordance with another embodiment of the invention. It should be noted that the EMS 302 can be distributed among various components of the Browser 300, including a Web Core 304 and a JavaScript (JS) Engine 306. As such, executable computer code for the EMS 302 can be distributed among various components or modules of the Browser 300 as will be known to those skilled in the art.

Referring to FIG. 4, the EMS 302 may be incorporated into the Browser 300 using various parts, including 302*a*, 302*b* and 302*c*. Alternatively, the EMS 302 can be provided as an independent or separate component 302 but it may introduce additional overhead. Browser 300 can be effectively implemented by or as a Web Kit. The Web Kit can include the Web Core 304 and JavaScript (JS) Engine 306 which may behave similar to conventional components of a conventional browser. As such, Web Core 304 can handle various tasks pertaining to processing of a web page, including HTML lexing/parsing, Document Object Model (DOM) Management, layout, etc. The JS Engine 306 can handle JavaScript parsing and execution of JavaScripts as will be generally known to those skilled in the art.

Generally, JavaScript can be used to write functions that can be embedded in (e.g. embedded between <script> and </script> tags) or functions that are included in one or more HTML pages and interact with the Document Object Model (DOM) of the page. Some simple examples of this usage are:
   Opening or popping up a new window with programmatic control over the size, position, and attributes of the new window (i.e. whether the menus, toolbars, etc. are visible)
   Validation of web form input values to make sure that they will be accepted before they are submitted to the server, and
   Changing images as the mouse cursor moves over them typically in order to draw the user's attention to important links displayed as graphical elements.

Because JavaScript code can run locally in a user's browser (rather than on a remote server), it can be used as more responsive means of processing user actions, thereby making an application feel more responsive. Furthermore, JavaScript code can detect user actions which HTML alone cannot, such as individual keystrokes. To give an example, a "Gmail" application can take advantage of JavaScript code to provide a significant portion of the user-interface logic, and use JavaScript to dispatch requests for information (e.g., dispatch content of an e-mail message) to the server. JS engine 306 can be provided as JavaScript interpreter or JavaScript implementation that interprets JavaScript source code and executes the script accordingly. As a common host environment for JavaScript, web browser 300 can typically use a public API to create "host objects" responsible for reflecting the DOM into JavaScript.

When the browser 300 requests a new web page (or "page") from a remote server 310, the input page is first passed to the HTML parser 304a in the Web Core 304 (step 1). Thereafter, the HTML parser 304a starts parsing the input page and initiating the operations necessary to construct a DOM tree from the input page. If the HTML parser 304a detects JavaScript code during this process, it passes the JavaScript code to the JS parser 306a (Step 2). JS parser 306a parses the code and initiates its execution through JS Runtime 306b (step 3). During this execution, JS code may attempt to modify the DOM tree, in which case it calls DOM API functions, or modifies the HTML page, for example, by calling "Document.write( )" function, in which case the modifications will be passed to the HTML parser (step 4). When the HTML parser 304a gets an input from JS engine 306 as an attempt to modify the HTML page, it processes this input as any other part of the page. This input may cause Web Core 304 to create new DOM nodes and/or to invoke the JS parser 306a if it detects a JavaScript code, for example provided between "<script>" and </script> tags. In other words, JavaScript code can write new JavaScript codes into the HTML page and the HTML parser can send the newly generated JavaScript code to JS Engine 306a for execution (step 5). Conventionally, JS Engine 306a would not be able to distinguish between the newly generated JavaScript code from JavaScript code originally present in the page.

However, it will be appreciated that EMS 302 can effectively detect JavaScript code originated from "tainted" text in the page by monitoring "tainted" text. This means that the browser 300 can be operable to effectively "taint" data that comes from potentially suspicious sources and store "taint" information along with the original data. Furthermore, the browser 300 can effectively propagate "taint" information through any processing and modifications of a web page. For example, if a new node is created or an existing node is modified in a DOM tree using "tainted" data, the new or modified node can be marked as tainted. As another example, if a JavaScript variable is computed from "tainted" data, the JavaScript variable is considered to be "tainted" too. Given the serious threat that cross-site scripting (XSS) attacks pose today, "tainting" and "taint" tracking mechanism that are especially suited to address XSS attacks are discussed in greater detail below.

In XSS attacks, code injected into a web application can be under the control of an attacker. For a DOM-based cross site scripting (XSS) attack, the prerequisite is that a vulnerable web application uses data sources which an attacker can easily influence. Fortunately, these data sources seldom contain executable scripts. Thus, by preventing execution of content of the data sources, DOM-based XSS attacks can be addressed in a very significant way. To this end, a mechanism that can keep track of how data in used in the browser 300 can identify data sources that can be easily altered by an attacker (or "suspicious sources"). Those skilled in the art will appreciate that "suspicious sources" can, for example, include data sources associated with one or more of the following: "Document.URL," "Document.URLUnencoded," "Document.location" (and many of its properties), "Document.referrer," and "Window.location" (and many of its properties). In addition, those skilled in the art will realize that one or more "suspicious sources" can be hardcoded in the Web Core 304 and/or read from a configuration file.

In any case, the EMS 302 can, for example, be operable to "taint" all the data from suspicious sources in the web browser 300 when the data is accessed. In particular, variables corresponding to suspicious sources in JS engine 306 can be tainted and the taint information can be propagated along the execution path. This can be achieved by extended the data structure classes in a WebKit, and in particular, by adding a Boolean variable to identify whether an object is tainted and adding two functions, taint( ) and isTainted( ), to each of the data structure classes.

The first function, taint( ), sets the Boolean value of its subject to true. In other words, it taints the object.

The second function, isTainted( ), returns the Boolean value of its subject, i.e., reports whether that object is tainted.

As noted above, the taint information can be propagated along execution paths. For example, "Strings" in JavaScript are managed using a "JSString" class, which is a subclass of a "JSCell" class. If the JavaScript code tries to change the URL, the execution path for this operation involves many functions from different classes and touches many different class objects. To be more specific, "JSString," "JSCell," "JSValue," and "UString" classes of JS Engine 306, as well as "String," "SegmentedString," "KURL", and "Node" classes of the Web Core 304 cab take a role in this process. As such, if the initial data (i.e., the "JSString") object is tainted, then this taint can be propagated through the entire path in accordance with the described embodiment. This propagation may require minor modification of all of class objects and associated functions as a function may just need to check whether its operands are tainted (e.g., via calling a "isTainted( )" function on the operands) and be able to taint its result if any of the operands are tainted.

There are several cases of JavaScript operations that could propagate the taint information. Exemplary cases include:
  (i) assignments: left operand is tainted if the right operand has been tainted;
  (ii) arithmetic and logic operations: the computed result is tainted if any of the operands has been tainted:
  (iii) function calls: since JavaScript passes arguments by reference, body of the function may not have to be treated specifically. The taint information can be stored in objects and would be propagated automatically inside the function body as long as the assignments and arithmetic/logic operations are considered
  (iv) control flow: in a few cases, some statements depend on the value of tainted variables. For example, the tainted variable is the value to be tested in the "IF" statement. However, there may be no need to take special consideration for control flow since DOM-based XSS can be effectively prevented as long as the taint information of suspicious sources is correctly propagated.

It should be noted that "taint" propagation can be considered in construction or modification of the DOM for a Web page. As a simple example, a tainted variable can be assigned to a node in a DOM tree and the node can be accessed by JavaScript later and modified as a result. In this case, the DOM node can be tainted to guarantee that the information flow path is preserved.

These measures can prevent execution of illegitimate and potentially harmful scripts when a web page is processed. Referring back to FIG. 4, HTML parser 304a can be prevented from passing illegitimate scripts (i.e., scripts that originate from suspicious data) to the JS parser 306b (step 5). HTML parser 304a can check the taint data of any scripts (i.e., taint of an associated DOM node) before passing it to the JS parser. If the data is tainted, Web Core 304a can take remedial action, for example, by treating the script as a regular text value instead of a script, displaying whitespaces, logging the script, or simply ignoring it. If the script is not tainted, the HTML parser 304a can pass it to the JS Engine 306 for execution. As will be readily apparent to those skilled in the art, the EMS 302 can be effectively provided at least in part as a component of the Web Core 304 even though it is depicted as a separate component in FIG. 4.

As noted above, a document (e.g., a web page) can be pre-marked with "untrusted" data (e.g., tainted data) when the document is obtained by a computing system operable to track and effectively propagate the "untrusted" mark. For a web page, a web server can be operable to mark data not trusted or fully trusted as "untrusted" data, and a client machine can tract the "untrusted" content and propagate the "untrusted" mark in accordance with the principles described above. This "hybrid" approach evolving both client and server sides may provide a better protection against XSS attacks than just taking measures on the client side. Techniques for marking "untrusted" data are described in greater detail below.

The various aspects, features, embodiments or implementations of the invention described above can be used alone or in various combinations. The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is

1. A computer-implemented method of processing a web page document that includes executable text and non-executable text, the method comprising:
   determining, using a hardware processor, whether the executable text has been derived from, affected by, or derived from and affected by untrusted content in the web page document when the web page document is processed prior to execution of the executable text in the web page document, wherein the untrusted content in the web page document includes text, textual content, or text and textual content for one or more scripts identified as tainted text within the web page document;
   identifying the executable text as being included in the untrusted content when it is determined that the executable text has been derived from, affected by, or derived from and affected by the untrusted content in the web page document; wherein identifying includes:
      marking one or more nodes of a document object model (DOM) tree generated for the web page document with a tainted mark when the one or more nodes are generated, modified, affected by, or generated, modified and affected by the untrusted content, as a result of interaction with the untrusted content, or generated, modified and affected by the untrusted content and as a result of interaction with the untrusted content;
      not allowing execution of the executable text when it is determined prior to execution of the executable text that the executable text has been derived from or has been affected by the untrusted content in the web page document; and
   propagating tainted information based on script operations propagating the tainted information from one or more of tainted operands, arguments, and variables.

2. The method of claim 1, wherein further comprising:
   marking other content in the web page document as untrusted content when it is determined that the other content has been derived from, affected by, or derived from and affected by the untrusted content in the web page document.

3. The method of claim 1, further comprising:
   effectively tracking the untrusted content during the processing of the web page document;
   marking other content in the web page document that is determined to be derived from, affected by, or derived from and affected by the untrusted content in the web page document as the untrusted content; and
   not allowing the other content to be executed when the other content is executable text marked as the untrusted content.

4. The method of claim 1, further comprising:
   effectively tracking the tainted text in the web page document;
   determining whether other text in the web page document has been affected by, derived from, or affected by and derived from the tainted text as result of interaction with the tainted text;
   marking the other text in the web page document also as tainted text when the determining determines that the other text in the web page document has been affected or derived from the tainted text.

5. The method of claim 1, further comprising:
   effectively propagating a tainted mark to other text in the web page document by marking the other text also as tainted text.

6. The method of claim 4, further comprising:
   identifying in the web page text that is untrusted as tainted text; and
   marking in the web page document the text as the tainted text.

7. The method of claim 6, wherein the identifying of text comprises one or more of the following:
   identifying text that can be altered or easily altered within the web page document, identifying text associated with input, user input, or input and user input,
   identifying text associated with a source that is untrusted, and
   identifying text associated with a source considered to a suspicious source.

8. The method of claim 5, wherein the script operations comprise one or more of: an assignment operation, arithmetic or logic operation, function call, and a control flow operation.

9. A computing system, wherein the computing system comprises:
   a document processor that uses a hardware processor for processing a web page document that includes non-executable content and executable text;
   a marking module that marks one or more nodes of a document object model (DOM) tree generated by a first parser for the web page with a tainted mark when the one or more nodes are generated, modified, affected by, or generated, modified and affected by untrusted content, and as a result of interaction with the untrusted content, or as a result of interaction with the untrusted content; and
   a second parser that prevents execution of executable text marked as the untrusted content within the web page document prior to execution of the executable text marked as the untrusted content that comprises one or more scripts when processing the web page document by a browser, wherein the marking module further propagates tainted information based on script operations propagating the tainted information from one or more of tainted operands, arguments, and variables.

10. The computing system of claim 9, wherein the first parser determines whether executable text in the web page document has been derived from, affected by, or derived from and affected by the untrusted content in the web page document when processing the web page document; and wherein the marking module identifies the executable text also as the untrusted content when determining that the executable text has been derived from or has been affected by the untrusted content.

11. The computing system of claim 10, wherein the marking module marks other content within the web page document as untrusted content when the other content has been derived from, affected by, or derived from and affected by the untrusted content in the web page document.

12. The computing system of claim 9, wherein the computing system obtains the web page document via Internet.

13. The computing system of claim 12, wherein the web page document includes text marked as tainted text when the computing system obtains the web page document.

14. The computing system of claim 10, wherein the marking module identifies in the web page document text that is untrusted as tainted text, and marks in the web page document the text as the tainted text.

15. The computing system of claim 9, where the computing system is a client that obtains the web page document from a server.

16. A non-transitory computer readable storage medium storing at least executable computer code for processing a web page document that can include non-executable content and executable text, wherein the non-transitory computer readable storage medium includes:

a first executable computer code operable to determine whether the executable text has been derived from, affected by, or derived from and affected by untrusted content in the web page document when the web page document is processed or is being processed;

a second executable computer code operable to identifying the executable text as the untrusted content when the first executable computer code operates to determine that the executable text has been derived from, affected by, or derived from and affected by the untrusted content in the web page document; wherein the second executable computer code includes:

a third executable computer code operable to mark one or more nodes of a document object model (DOM) tree generated for the web page document with a tainted mark when the one or more nodes are generated, modified, affected by, or generated, modified and affected by the untrusted content, as a result of interaction with untrusted content, or as a result of interaction with the untrusted content; and a fourth executable computer code operable to deny execution of the executable text comprising one or more scripts, prior to execution of the executable text, when the first executable computer code operates to determine that the executable text has been derived from or has been affected by the untrusted content, wherein the third executable code further operable to propagate tainted information based on script operations propagating the tainted information from one or more of tainted operands, arguments, and variables.

17. The non-transitory computer readable storage medium of claim 16, wherein the processing of the web page document is performed by a browser.

18. The method of claim 1, further comprising:

determining, by a hypertext markup language (HTML) parser, tainted data of an associated DOM node prior to passing the tainted data to a parser; and preventing parsing of illegitimate scripts that originate as suspicious data by the parser based on the determining of tainted text by the HTML parser.

19. The computing system of claim 9, wherein the first parser comprises a hypertext markup language (HTML) parser, and the second parser comprises a script-based parser.

20. The computing system of claim 19, wherein the HTML parser detects tainted data of an associated DOM node prior to passing the tainted data to the script-based parser for preventing the script-based parser parsing of illegitimate scripts that originate as suspicious data based on the detection of text identified as tainted text by the HTML parser.

21. The method of claim 1, wherein the computer-implemented method further comprises:

determining that text representative as data is derived from, affected by, or derived from and affected by text comprising one or more scripts indicated as tainted text or tracked as tainted based on an interaction with the text indicated as tainted text and marking other text in the web page document as tainted text based on determining the text representative of data is derived from, affected by, or derived from and affected by text indicated as tainted text or tracked as tainted.

* * * * *